United States Patent [19]

Dooley

[11] 4,449,642

[45] May 22, 1984

[54] SEED PLANTER

[75] Inventor: James H. Dooley, Federal Way, Wash.

[73] Assignee: Weyerhaeuser Company, Tacoma, Wash.

[21] Appl. No.: 476,737

[22] Filed: Mar. 18, 1983

[51] Int. Cl.³ .............................................. A01C 7/04
[52] U.S. Cl. ..................................... 221/211; 111/34;
111/77
[58] Field of Search ............... 221/266, 278, 211, 235, 221/10, 6; 111/34, 80, 77, 78

[56] References Cited

U.S. PATENT DOCUMENTS

| 3,122,283 | 2/1964 | Walters | 111/34 X |
| 3,387,746 | 5/1968 | Whipple | 111/34 X |
| 3,990,606 | 11/1976 | Gugenhan | 221/211 |
| 4,145,980 | 3/1979 | Boots | 111/1 |
| 4,210,260 | 7/1980 | Luttrell | 221/278 |
| 4,241,849 | 12/1980 | Harrer | 221/266 |
| 4,265,368 | 5/1981 | Feltrop | 221/10 |
| 4,285,444 | 8/1981 | Tye | 221/211 |
| 4,306,509 | 12/1981 | Hassan et al. | 111/34 |

FOREIGN PATENT DOCUMENTS

| 3003919 | 8/1981 | Fed. Rep. of Germany . |
| 738536 | 6/1980 | U.S.S.R. . |
| 745410 | 7/1980 | U.S.S.R. . |
| 762773 | 9/1980 | U.S.S.R. . |

Primary Examiner—Robert A. Hafer
Assistant Examiner—Danton DeMille
Attorney, Agent, or Firm—Weyerhaeuser Company

[57] ABSTRACT

The present invention is an improved seed sower unit and an improved seed supply hopper for the head. Opposed vacuum disc-type sower units are mounted in a frame. A seed hopper is mounted on a separate subframe. The hopper subframe has mounting notches which rest on stub pins projecting from the main frame. A latch mechanism holds the seed hopper subframe in place during operation. By opening the latch, the subframe with the seed hopper can be lifted vertically from between the sower discs to permit ready access for cleaning or repair. The seed hopper portion has a sloping bottom member adapted to fit between the sower discs to form a seed trough. This sloping member has a gate so that seed can be easily drained from the system into a container without loss. An optional second gate enables the seed hopper to be isolated from the seed trough. By making the seed hopper vertically removable, the sower units may be located in close proximity to each other, thus enabling similarly close crop row spacing.

20 Claims, 6 Drawing Figures

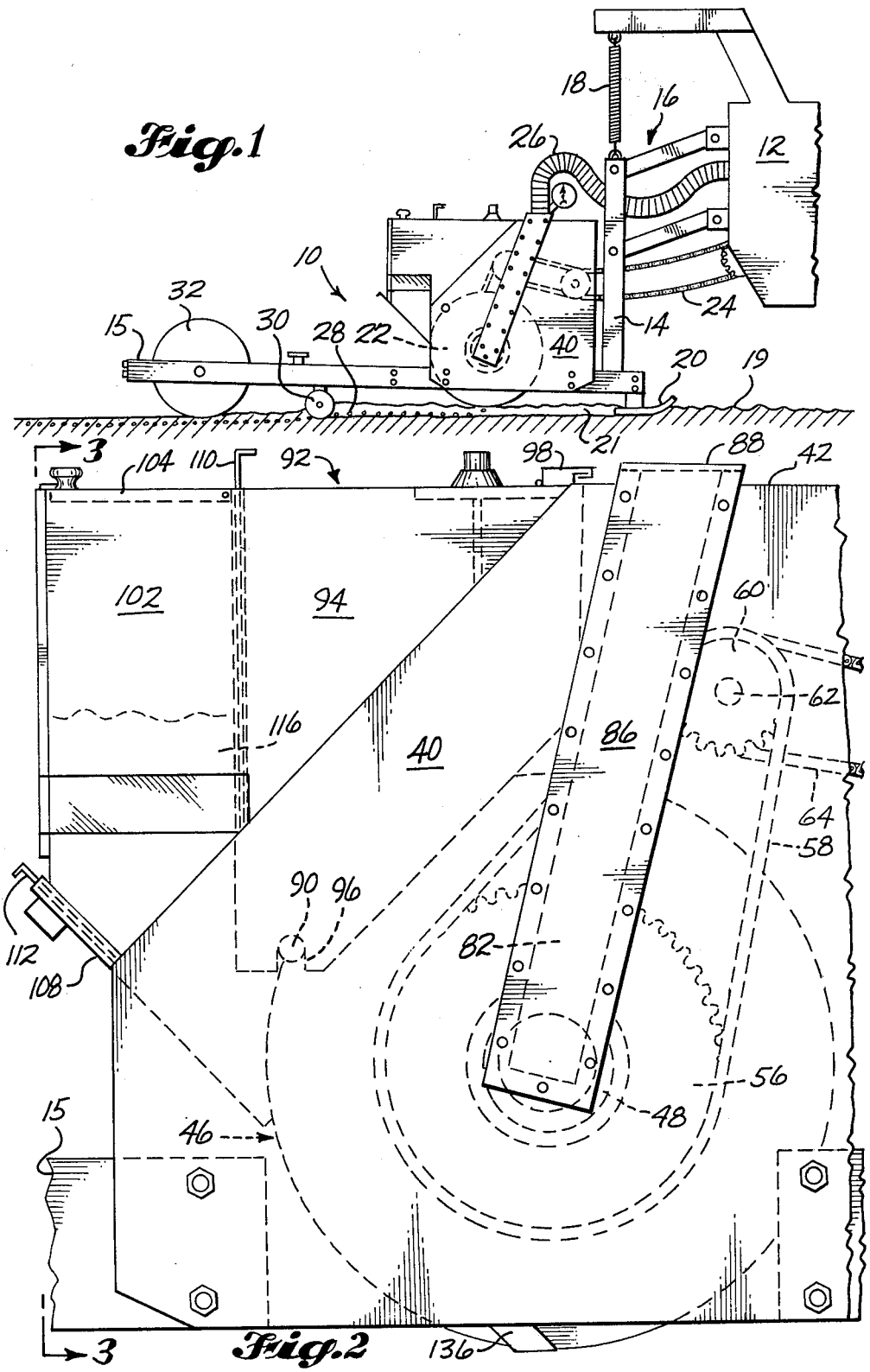

SEED PLANTER

BACKGROUND OF THE INVENTION

The present invention is an improved vacuum disc-type precision seed planter. It is particularly well adapted for planting double rows of seed at high speeds with a high degree of accuracy in seed placement. Multiple units may be assembled side-by-side on a tool bar so that all the rows in a wider bed may be planted simultaneously.

Seed planters, sometimes called seed drills, have been known for many years. They are called upon to handle a wide variety of different sizes, shapes and weights of seeds. These may range from very minute seeds, such as carrot or celery, to large seeds, of which corn and the various types of beans are exemplary. These seeds must be planted with different spacings between plants within a given row and between rows. Spacing is heavily dependent on the size the plants obtain at harvest time. For many crops, the optimum planting time is relatively short. In some cases, many hundreds of acres may need to be planted within a total time not exceeding a week or ten days. Unfavorable weather may still further limit the available planting time. For this reason, agricultural seed planters must be rugged and reliable since major breakdowns could prove disasterous to the farmer who might not then be able to get his crop sown in the prescribed time period.

The importance of planting a given crop at optimum spacing between plants and between rows has been recognized for some time. If seeds are planted irregularly, or too close together, the ultimate crop yield may be reduced. If planted too far apart, the farmer is not achieving optimum use of his valuable land. Considerable precision in ultimate seed placement is becoming more and more demanded in sowing units. The advent of mechanical harvesting machines for greater varieties of crops places further demands on accuracy of seed placement.

A considerable number of excellent seed sowers are available on the market today. An individual sowing unit normally comprises a means of opening a furrow, means for singulating seeds from a seed supply, means for transferring the singulated seed into the furrow at some predetermined spacing, and means for closing the furrow. The singulation process is one of the key elements in any successful planter. A number of systems have been developed to accomplish this purpose. Among them are ones which have a plate or drum containing a multiplicity of cavities designed to accommodate only a single seed of the crop being sown. Others are arranged like spokes on a wheel and have small cups at the end of each spoke which will accommodate only a single seed. These devices normally rotate through a supply of seed which is maintained constant by the flow from a hopper or other source.

Vacuum-type seeders are more pertinent to the present invention. These may have either a relatively flat disc or an elongated drum whose interiors are in communication with a fan or other device to reduce the air pressure within the unit. In the case of drums, they are usually provided with multiple rows of circumferential holes which serve to pick up seeds from a seed source due to the reduced pressure within the drum. Disc-type sowers work in similar fashion except that they normally have a circular array of small holes near the periphery and act to pick up seed for only one crop row at a time. Both types have some means to release the seed at the desired point, whereupon it either falls directly into a furrow or into a tube or chute which conveys it to a furrow. Various recent examples of drum type seeders can be seen in U.S. Pat. Nos. to Boots, 4,145,980; Luttrell, 4,210,260; Feltrop, 4,265,368; Hassan et al., 4,306,509; and West German DE No. 30 03 919 to Becker. Examples of disc-type seeders employing an internal vacuum to hold seeds to the face of the disc are seen in Soviet Union Pat. Nos. 745,410; 738,536; 762,773 and in U.S. Pat. Nos. to Gugenhan, 3,990,606; Harrer, 4,241,849; and Tye 4,285,444. While this list is exemplary rather than exhaustive, it does include all of those devices which the present inventor believes to be most closely related to the present invention. The patents to Tye and Gugenhan are of the greatest pertinence and will be discussed in more detail.

Gugenhan U.S. Pat. No. 3,990,606 is exemplary of a single row vacuum disc-type seeder which has experienced considerable commercial success. A single seeder unit has at its heart a thin, rotatable drum or disc unit the interior of which is connected to a vacuum source. The face of the drum has a single circle of suction holes near its periphery. A hinged seed chamber partially encloses the face of the drum and acts as a reservoir of seeds. These are held to the holes by the internal vacuum as the drum rotates through the seeds. There is a tendency in a device of this type for more than one seed to become attached to each individual hole. A number of different types of seed singulation mechanisms have been developed for vacuum disc-type seeders. These usually comprise a stationary bar or some similar means which brushes the seeds as they rotate past. These often have saw toothed, or serrated edges so that the seeds are bumped two or three times. This gentle agitation is usually sufficient to dislodge all but the single seed which is most tightly held against the hole. As the seed disc continues to rotate, an internal device blocks the hole at a given point so that the vacuum can no longer effectively hold the seed which drops off into the furrow or planting tube. Some sowers, such as the example to Gugenhan, also have an external bar which dislodges the seed simultaneously with the action of the vacuum breaker. One deficiency of the Gugenhan type device is the fact that any seed within the hopper will be spilled if it is ever necessary to open the hinged plate comprising this seed pick up reservoir. A field situation when this could be required is when a number of holes in the pickup disc have been become plugged by dirt or other debris. Because there must be access from the side to open the hinged seed reservoir, sowers of this type are not suitable for planting double rows.

While most crop plants are sown in single rows, sometimes higher densities can be achieved if each row actually is a double row in which the two individual rows are separated by only a few centimeters. Plants in these rows may sometimes be staggered to give more effective growing space. Double row seeding is readily accomplished with drum type sowers; e.g., Hassan et al., U.S. Pat. No. 4,306,509 or Luttrell U.S. Pat. No. 4,210,260. However, these sowers do not generally operate at a level of speed and reliability which is desirable for high speed precision planting. To the present inventor's knowledge, there is no disc-type seeder commercially available which will conveniently sow a double row. Presumably, the sower shown in U.S. Pat. No. 4,285,444 to Tye could be modified for double row sowing. The Tye device uses a pair of opposed sower discs a short distance apart. These pick up seed from a common hopper and seed trough and discharge into a single planting tube. However, the Tye mechanism is of relatively complex construction and cannot be conveniently disassembled in the field if the apertures should become plugged or some other problem arises. If this were the case, it would be virtually necessary to return the offending seeder unit to the shop with the resulting significant loss of planting time, or to have a replacement unit in the field which could be substituted. Even the installation of a replacement unit requires some tools and a certain amount of mechanical skill on the part of the tractor driver. There is no convenient way to remove any seeds left in the unit after sowing or before disassembly.

The present invention overcomes many of the problems associated with disc-type vacuum seeder heads. It can sow double rows, if desired, at high speed and with a high degree of precision. Further, the seeder can be rapidly and easily disassembled in the field for repair or cleaning without the need for any tools and without loss of seed.

SUMMARY OF THE INVENTION

The present invention comprises a double-row, disc-type vacuum sower unit for a seed planter. It is based upon a pair of opposed disc-type rotatable seed sowing assemblies contained within a supporting frame which can be mounted to a tool bar or other suitable device. The supporting frame is generally in the form of an inverted U. Within the frame, on the arms of the U, are short, horizontally opposed hollow stub, shafts. The interior portions of the shafts are adapted for communication with a vacuum source, normally the inlet side of a centrifugal blower. The seed sowing assemblies are mounted on these shafts. Each of the assemblies comprises a first relatively thin, generally drum-shaped member, adapted for rotation on the stub shaft, and a second relatively thin, generally drum-shaped member, which is telescopically lightly friction mounted to the first member. The two members define a generally disc-shaped vacuum chamber which is in communication with the vacuum source through the stub shaft. The second drum shaped member is a planting disc and has a circular pattern of small seed transporting orifices near the periphery. These orifices are also in communication with the vacuum chamber and served to pick up seeds from a seed source. A vacuum breaker means is located inside the disc-shaped vacuum chamber and acts against the orifices at a predetermined, seed-releasing point. This serves to block off the orifice from the vacuum source so that the seed is dropped into the furrow or a planting tube.

An important part of the invention is the provision of an easily removable seed hopper means which supplies seed for the sowing assemblies. This seed hopper is constructed on a subframe which is supported on the U-shaped sower unit frame. The subframe serves as a mounting means for a seed reservoir. This reservoir has a downwardly sloping bottom member which is sized so that it can be snugly disposed between the seed sowing assemblies and serves as a means to transport seed from the reservoir to the volume between the sower discs. An angularly attached retainer plate to this bottom member forms a seed supply trough between the sowing assemblies. This trough contains a working volume of seed which is kept at an essentially constant level by new seed flowing from the reservoir along the sloping bottom member. The seed hopper subframe contains an indexing means which locates it precisely on the sower unit frame. This indexing means is preferably a pin and notch arrangement so the hopper can be located in operating position without the need for bolts. The hopper should be freely vertically slidable into and out of operating position between the seeder discs where it is held in position by a latch means. When the latch means is released, the hopper may be lifted vertically out of the way to permit ready access to the seed sowing assemblies. Because the second drum-shaped members, or seeder discs, are telescoped over their corresponding members, they can be simply and rapidly slipped off in the field without any tools being required.

In a preferred version of the sower unit, the seed hopper has a gate means located in its sloping bottom member. This enables seed within the reservoir and in the supply trough between the sower discs to be drained into a container and recovered without loss when it is desirable either to empty the reservoir or remove the seed hopper from the planter. The seed hopper may contain a second gate which closes off the reservoir from the seed supply trough. Then, if is necessary to remove the seed hopper, only a small amount of seed must be drained from the system. The use of these gates comprises a major advantage of the present sower unit. In all other systems known to the present inventor, it is impossible to remove the seed hopper without spilling most or all of the contained seed. This is clearly disadvantageous from a number of standpoints. A further major advantage lies in the fact that the hopper may be inserted or removed essentially vertically. This eliminates the need for side clearance required to open a hinged-type hopper and permits close crop row spacing.

The sower unit can be readily converted to a single row type simply by replacing one of the apertured sower discs with a blank disc.

It is an object of the present invention to provide an improved single or double-row, disc-type vacuum sower unit which results in more precise seed placement and enables higher field operating speeds.

It is another object to provide a disc type vacuum sower unit for a seed planter which is greatly simplified in construction and can be easily and readily maintained in the field without the need for any tools.

It is a further object of the present invention to provide an improved seed hopper for a disc-type vacuum sower unit which prevents any seed loss if the unit must be disassembled before all of the seed has been planted.

These and many other objects will become readily apparent to ones skilled in the art upon reading the following detailed description taken in conjunction with the attached drawings.

BRIEF DESCRIPTION OF THE DRAWINGS

FIG. 1 is a right side elevation showing a sower unit mounted to a tractor unit as it would be in operation.

FIG. 2 is a right side elevation showing one sower unit.

DETAILED DESCRIPTION OF A PREFERRED EMBODIMENT

Figure 3:
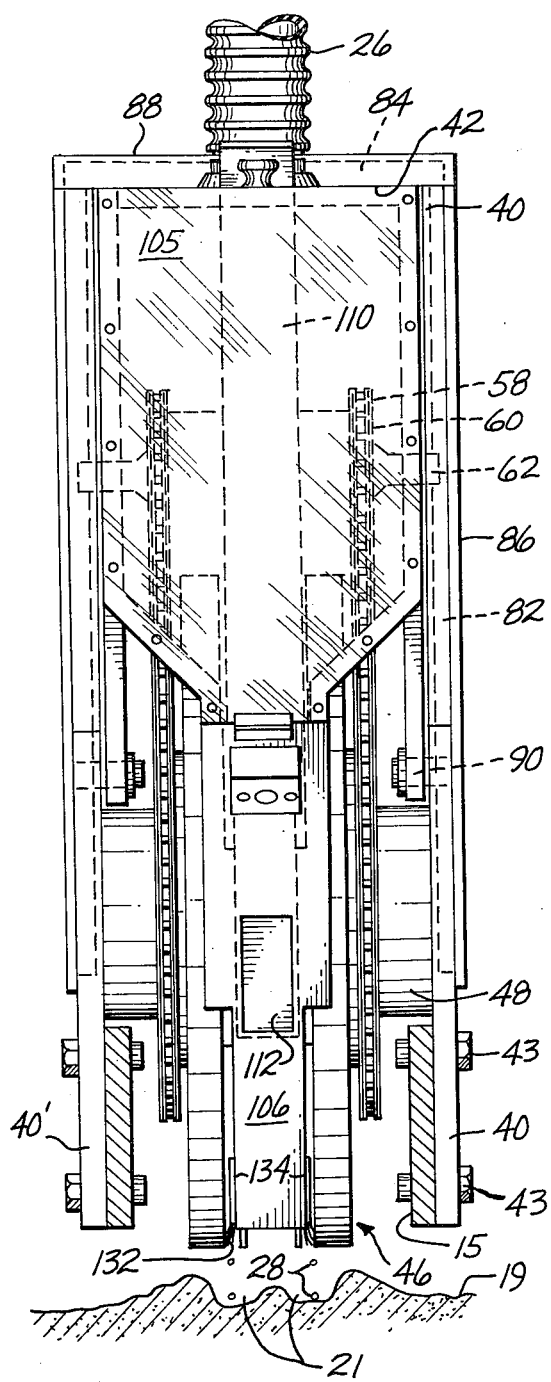
FIG. 3 is a rear elevation of a sower unit taken along line 3—3 of FIG. 2.
Figure 6:
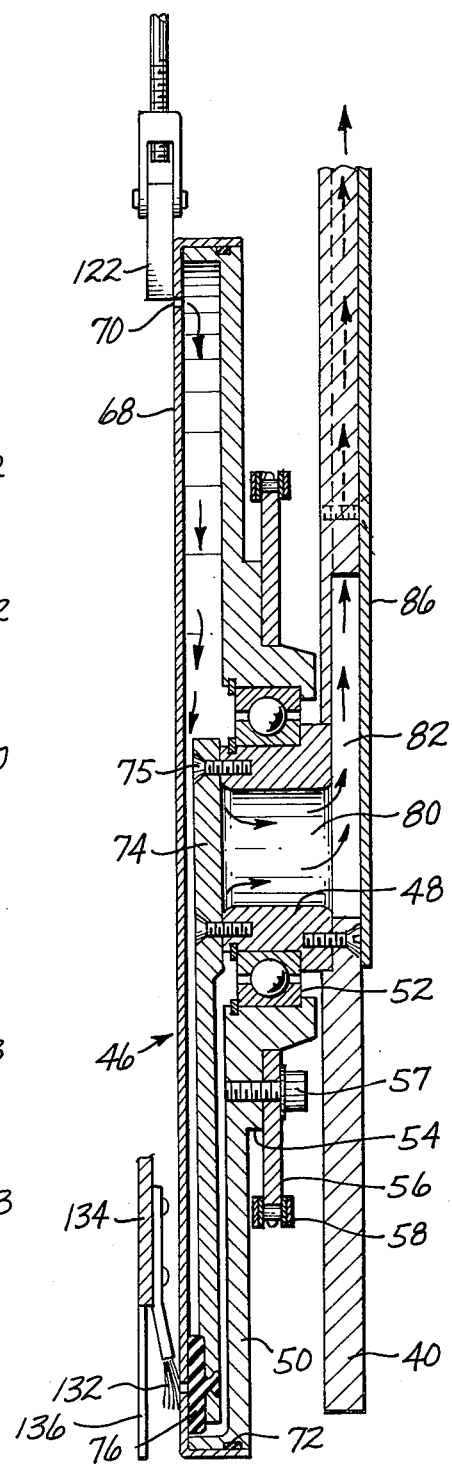
FIG. 6 is a section, half cut away, seen along line 6—6 of FIG. 4.
Figure 4:
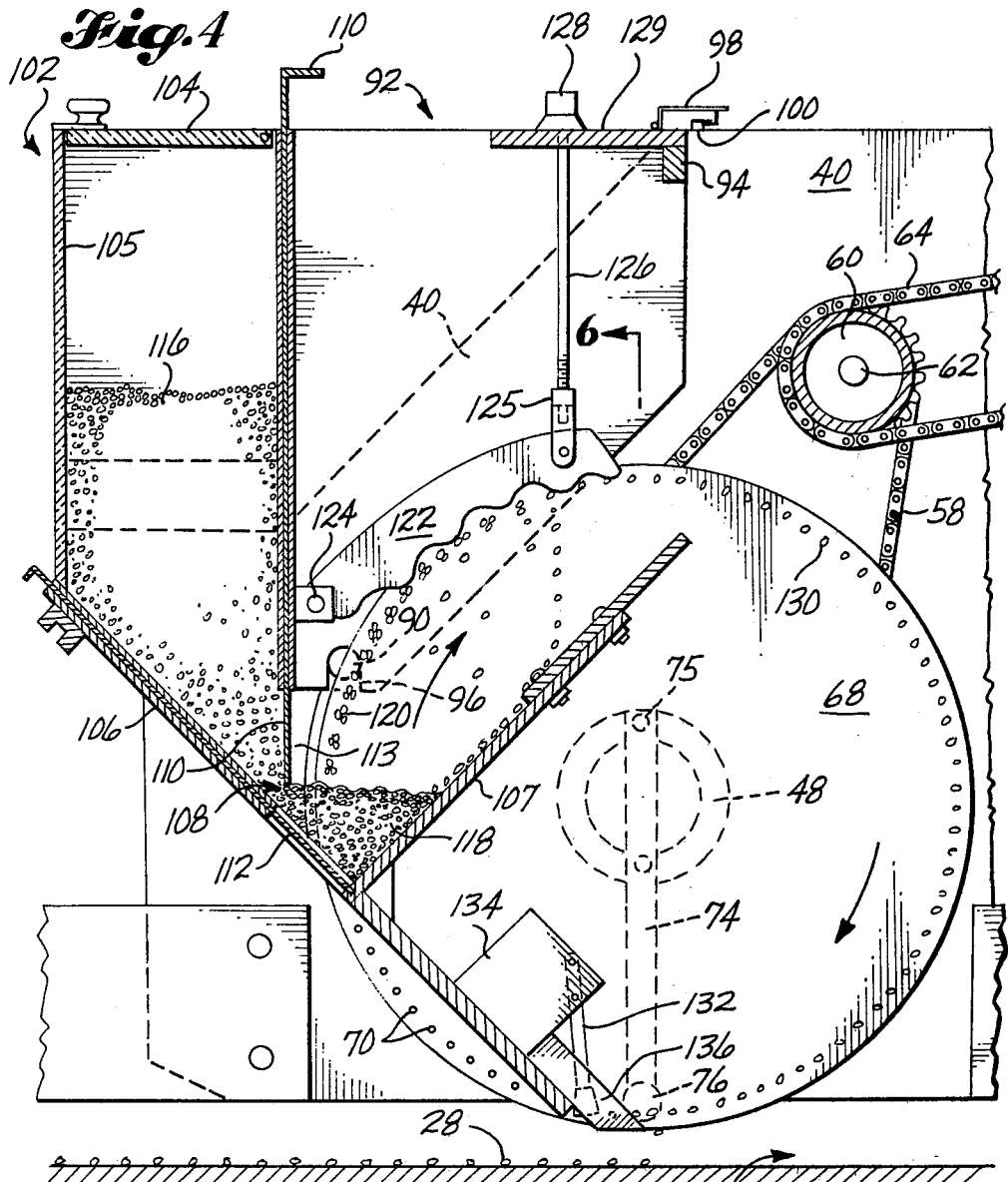
FIG. 4 is a right side elevation, half cut away, showing a sower unit and its associated seed hopper.
Figure 5:
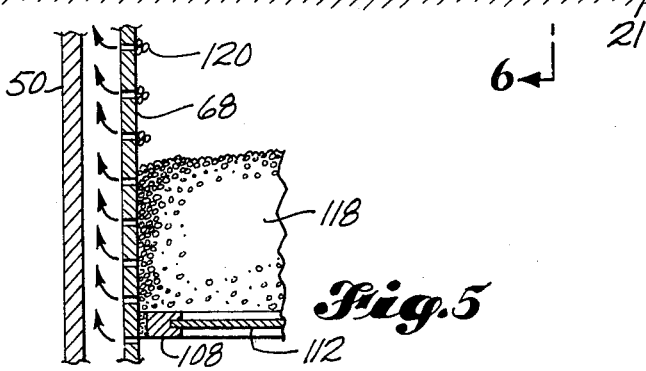
FIG. 5 is a fragmentary detailed sketch showing the sower disc picking up seed as it rotates.

The operation of the improved sower unit of the present unit will now be described in detail. FIG. 1 shows a single sower unit as it might be mounted to a tractor. It should be understood that in normal operation a number of these units would be ganged together in a side-by-side relationship so that several rows would be sown simultaneously. The sower unit is generally shown at 10 where it is mounted to a plate or tool bar 12 at the rear of a prime mover. The sower unit itself is supported on a frame consisting of members 14, 15. This is advantageously mounted to the tool bar or prime mover by parallel arm linkage 16. The unit may be counterbalanced by spring 18 operating between frame member 14 and a bar extending from the prime mover. In FIG. 1 the unit is seen sowing seeds into ground surface 19. A furrow opener 20 has opened a furrow 21 to receive the seed being sown. Sower unit 22 is driven by a chain series 24. The rotational speed of the sower unit in relationship to the ground speed of the tractor will in part determine the seed spacing. Tractor speed may conveniently be measured by a gage wheel, not shown, which can then operate through a speed controller, also not indicated, to control the rotational speed of sower units 22. In a preferred version of the invention, ganged together gage wheels mounted on opposite sides of the unit will serve to drive the chain series 24 so they need not be tied in any way to the power take-off unit of the tractor. A hose 26 connects the sower units to a vacuum source which may be of any type but will usually be a centrifugal fan. As the tractor advances along the row the seeds 28 are dropped into the furrow 21 from sower unit 22. The furrows are covered by a disc or plow unit 30 and the covered row is then lightly compacted by a roller 32.

Referring to the other figures, the best mode of construction and operation known to the inventor will now be described. Each individual sower unit is mounted on an inverted generally U-shaped frame having side or arm members 40, 40' and an upper cross member 42. The frame supporting the sower unit is tied to the main frame by bolts 43. A seed sowing assembly, generally shown at 46, is mounted on hollow stub shafts 48 which protrude inwardly from the side members of the sower unit frame. Since the sower unit being described is a unit adapted for sowing a double row of seed and generally consists of two units in a mirror relationship to each other, only one side has been numbered in the drawings to avoid confusion. A first thin, generally drum-shaped member is rotatably mounted on shaft 48 on ball bearing 52. This member has a shoulder portion 54 to which is mounted a sprocket wheel 56 held in place by cap screws 57. The sprocket is driven by link chain 58 through a second sprocket system 60 mounted on shaft 62. This, in turn, is tied to drive chain 24 through chain 64 and another intermediate sprocket system, not shown in detail, which serves to drive all of the sower units simultaneously.

A relatively thin drum-shaped sower disc member 68 is mounted telescopically over first drum-shaped member 50. These two members are held together by a light friction fit and are sealed against air leakage by O-ring 72 or a similar gasketing means. The two drums together define a vacuum chamber which is in communication with the vacuum source through the hollow center 80 of stub shafts 48. The sower discs bear a series of holes or orifices 70 along a circular path near the periphery. These holes are in communication with the interior vacuum chamber and serve to pick up seeds from a seed source. A depending bar 74 may be conveniently mounted by machine screws 75 across the interior open end of stub shaft 48. At its distal end, this bar supports a flexibly mounted pad 76 whose center is along the circle defined by the seed pickup orifices. This pad, which may be conveniently made of a low friction plastic material, serves as a vacuum breaker as the holes 70 reach the lowest portion of their travel nearest the furrow. As the holes pass over the vacuum breaker disc, the seeds drop off into the furrow.

The interior 80 of stub shafts 52 is in communication with channels 82, 84 machined or otherwise formed in frame members 40 and 42 respectively. These channels then communicate with the vacuum source through hoses 26.

While the sower as pictured in the illustrations is designed for sowing a double row of seed, it can readily be adapted for sowing a single row by the simple expedient of placing in a blank sower disc 68 lacking any orifices 70.

One of the major improvements of the present invention over earlier sowers is the unique construction of the seed hoppers and their relationship to the sower discs. When it is desired to access the sower discs for any reason as; e.g., to change to discs with different hole spacing or to clear plugged orifices, the seed hopper is designed to be lifted out of the way vertically without the need for any tools. This is accomplished as follows. Stub mounting pins 90 are provided at a predetermined location on the inside faces of U-shaped frame arm members 40. A seed hopper subassembly 92 is constructed on a subframe 94 possessing a pair of opposed notches 96. These notches are located so that the seed hopper can be slid essentially vertically between the sower discs so that the notches rest on pins 90 to accurately position the hopper with regard to the sower discs. This arrangement could be reversed so that the pins were located on the hopper subframe and the notches in the U-shaped supporting frame. The seed hopper is held tightly to the sower unit U-shaped frame by a latch means 98 which cooperates with a pin or similar member 100 on the U-shaped frame. The subframe 94 bears a seed hopper, generally indicated at 102. This is most conveniently constructed so as to have a rectangular cross section. The seed hopper has a hinged lid 104 for pouring in seed and a front panel 105. These are conveniently made of a transparent plastic material so that the operators can readily determine the level of seed in the hopper. The seed hoppers have a downwardly bottom member 106 which extends between the sower discs almost to the lower periphery. This has a seed retainer plate 107 located approximately normal to the sloping bottom member at about the midpoint of its length. An open zone 108 at the bottom of the seed hopper enables seed to flow from the hopper between the lips 113 and into the trough defined by members 106 and 107. Seed in the trough is retained along the side by the sower discs. Members 106 and 107 are sized to fit snugly between the sower disks so as to prevent loss of any seed around their edges. The area which lies between the sower discs may conveniently be faced with strips of a plush or pile material so as to prevent seed loss without creating a metal-to-metal fit which is so tight that the hopper could not be easily removed or reinserted. Lips 113 may also be faced with a similar plush material.

One of the several novel features of the seed hopper in the series of gates which may be used for seed control. Sliding gate 110 controls flow of seed from the main hopper into the trough area located between the seeder discs. It may be fully opened to insure a heavy flow of seed or it may be closed completely to prevent seed from flowing from the main hopper into the trough. Sliding gate 112 is located in the sloping bottom member of the hopper and is useful for draining seed from the system without loss when it becomes necessary to have access to the sower discs or at the end of a run when not all of the seed has been sown. This can be done by the simple expedient of putting a can or other container under the opening at gate 112. Any seed within the trough can be drained without loss and without spilling it on the ground where it could grow into a high density nuisance cluster of plants.

With control gate 110 conveniently adjusted, a supply of seed 116 in the main hopper flows into the seed trough between plates 106 and 107 to form a working seed supply 118. As the discs rotate by this seed supply, seeds are attracted to the orifices 70 where they held by virtue of the higher air pressure outside the sower discs relative to that in the vacuum chamber inside.

Many seeds will tend to form clusters of 2-4 seeds as they are attracted to orifices 70 by the differential air pressure. This is normally an undesirable situation. In order to control it a singulation knife 122 is positioned so that its edge lies along an arc just outside the circle of seed pickup orifices. The contacting edge may conveniently be sawtoothed or sinusoidal in configuration. Singulation knives are pivotally mounted at their proximal ends to the seed hopper subframe at 124. At their distal ends they are held in yokes 125 connected to shafts 126. A screw adjustment 128 mounted on plate 129 attached to subframe 94 serves to enable precise adjustment of the singulation knife with respect to the circular pattern of orifices 70. Plate 129 is conveniently made of a transparent plastic material so an operator can readily see into the seed trough area. Singulated seeds 130 are carried around on the face of the sower discs until they are over the vacuum breaker means 76 whereupon they are dropped into furrow 21. On rare occasions a seed may lodge into one of the orifices. When this happens, it can be removed by small brushes 132 suspended from support plates 134 mounted to the sloping bottom member 108 of the seed hopper. Deflection plates 136 prevent these seeds from being thrown outward.

Having thus described the best mode known to the inventor of practicing the present invention, it will be apparent to those skilled in the art that many departures can be made from the structure disclosed that would still be considered to be within the scope of the invention. The invention is thus to be considered limited only by the following claims.

What is claimed is:

1. In a sower unit for a seed planter of the type having opposed rotating vacuum-type seeder discs, an easily removed seed hopper which comprises:
   a. a frame containing a seed reservoir having a downwardly sloping bottom member adapted to fit snugly between the seeder discs, said member further having an angularly attached seed retainer plate which defines a seed supply trough between the discs;
   b. indexing means associated with the frame for mounting the hopper in a precise predetermined location with respect to the seeder discs;
   c. latch means for securing the hopper in operating position; and
   d. a seed drain gate means located in the sloping bottom member of the reservoir adjacent to the seed retainer plate, to enable seed within the reservoir and supply trough to be drained into a container and be recovered without loss when it is desirable to empty the reservoir or remove the seed hopper from the seed planter.

2. The seed hopper of claim 1 which further includes a reservoir gate means located between the seed reservoir and the supply trough, said gate being adapted to close the reservoir and retain seed in it when the seed drain gate in the bottom member is opened to drain the seed from the supply trough.

3. The seed hopper of claim 1 in which the seed drain gate means comprises a sliding gate.

4. The seed hopper of claim 3 in which both gate means comprise sliding gates.

5. The seed hopper of claim 1 which further includes seed singulation knives which act against each seeder disc to reduce the incidence of multiple seeds carried at the disc orifices, each singulation knife having one end pivotally attached to the frame and an opposite end connected to a screw adjustment means, said adjustment means cooperating with the frame to move each singulation knife in a limited arc about its pivot point so that it moves essentially radially in or out across the face of the seeder disc.

6. The seed hopper of claim 1 in which the indexing means comprises a pair of horizontally opposed notches on the frame which are adapted to engage corresponding stub pins located on the main frame of the seeder unit.

7. The seed hopper of claim 1 in which the indexing means comprises a pair of horizontally opposed stub pins which are adapted to be cradled in corresponding notches located on the main frame of the seeder unit.

8. The seed hopper of claim 1 which further includes brush means depending from the sloping bottom member and acting against the seeder discs to insure release of seeds from the discs.

9. The seed hopper of claim 1 which further includes a single side plate mounted on one side of the seed supply trough defined by the reservoir bottom member and seed retainer plate thus adapting the hopper for use with a single disc sower.

10. A double row disc-type vacuum sower unit for a seed planter which comprises:
   a. a supporting frame generally in the form of an inverted U;
   b. horizontally opposed hollow stub shafts located inside the frame on the arms of the U, the interior portions of the shafts adapted for communication with a vacuum source;
   c. rotatable seed sowing assemblies mounted on each shaft, each assembly comprising
      a first thin, generally drum-shaped member rotatably mounted on the stub shaft;
      a second thin, generally drum-shaped sower disc member friction mounted to the first member, the two members defining a vacuum chamber in communication with the vacuum source through the stub shaft, the sower disc member having a series of seed transporting orifices through its face along a circular path near the periphery in communication with the vacuum chamber and serving to pick up seeds from a seed source;

vacuum breaker means inside the disc-shaped vacuum chamber acting against the orifices at a predetermined seed release point; and d. a vertically removable seed hopper means to supply seed for the sowing assemblies, said seed hopper comprising a subframe supported by the U-shaped sower unit frame, a seed reservoir mounted on the subframe, a downwardly sloping bottom member on the seed reservoir disposed between the seed sowing assemblies, said bottom member having an angularly attached seed retainer plate which defines a seed supply trough between the sowing assemblies, indexing means for precisely locating the seed hopper subframe on the sower unit frame, and latch means for securing the hopper in operating position, said hopper means being freely vertically slideable into or out of operating position when the latch means is released to permit ready access to the seed sowing assemblies.

11. The sower unit of claim 10 in which the indexing means of the seed hopper means comprises a pair of horizontally opposed notches in the hopper subframe which are adapted to engage and rest on corresponding stub pins located on the sower unit supporting frame.

12. The sower unit of claim 10 in which the indexing means of the seed hopper means comprises a pair of horizontally opposed stub pins on the hopper subframe which are located to engage and be cradled in corresponding notches located on the sower unit supporting frame.

13. The sower unit of claim 10 which further includes a seed drain gate means located in the sloping bottom member of the reservoir adjacent to the retainer plate, to enable seed within the reservoir and supply trough to be drained into a container and be recovered without loss when it is desirable to empty the reservoir or remove the seed hopper from the planter.

14. The sower unit of claim 13 which further includes a reservoir gate means located between the seed reservoir and supply trough, said gate being adapted to close the reservoir and retain seed in it when the seed drain gate in the bottom member is opened to drain the seed from the supply trough.

15. The sower unit of claim 13 in which the seed drain gate means comprises a sliding gate.

16. The sower unit of claim 14 in which both gate means comprise sliding gates.

17. The sower unit of claim 10 which further includes seed singulation knives acting against each seeder disc to reduce the incidence of multiple seeds carried at the disc orifices, each singulation knife having one end pivotally attached to the seed hopper subframe and an opposite end connected to a screw adjustment means, said adjustment means cooperating with the subframe to move each singulation knife in a limited arc about its pivot point so that it moves essentially radially in or out across the face of the seeder disc.

18. The sower unit of claim 10 which further includes brush means depending from the sloping bottom member and acting against the seeder discs to insure release of seeds from the disc.

19. The sower unit of claim 10 in which one of the sower disc members lacks seed transporting orifices so that the sower unit can function as a single row sower.

20. The sower unit of claim 10 in which the first and second drum-shaped members are mounted together telescopically.

* * * * *